(12) United States Patent
Goto et al.

(10) Patent No.: US 7,038,158 B2
(45) Date of Patent: May 2, 2006

(54) WIRE ELECTRICAL DISCHARGE MACHINING APPARATUS

(75) Inventors: Akihiro Goto, Tokyo (JP); Kouichiro Hattori, Tokyo (JP); Kazushi Nakamura, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 67 days.

(21) Appl. No.: 10/487,036

(22) PCT Filed: Aug. 30, 2002

(86) PCT No.: PCT/JP02/08787

§ 371 (c)(1),
(2), (4) Date: Feb. 17, 2004

(87) PCT Pub. No.: WO2004/022275

PCT Pub. Date: Mar. 18, 2004

(65) Prior Publication Data

US 2005/0145603 A1    Jul. 7, 2005

(51) Int. Cl.
*B23H 7/04* (2006.01)
*B23H 1/02* (2006.01)

(52) U.S. Cl. .................. 219/69.12; 219/69.13
(58) Field of Classification Search ............ 219/69.12, 219/69.13, 69.16, 69.18
See application file for complete search history.

(56) References Cited

U.S. PATENT DOCUMENTS

| 5,869,797 | A | * | 2/1999 | Goto et al. ............ 219/69.13 |
| 6,222,149 | B1 | * | 4/2001 | Toyonaga et al. ........ 219/69.13 |
| 6,252,191 | B1 | * | 6/2001 | D'Amario ............... 219/69.13 |
| 6,385,500 | B1 | * | 5/2002 | Hebbar et al. .......... 700/162 |

FOREIGN PATENT DOCUMENTS

| JP | 50-79895 | A | 6/1975 |
| JP | 61-260915 | A | 11/1986 |
| JP | 63-123611 | A | 5/1988 |
| JP | 5-212618 | A | * | 8/1993 | ...... 219/69.12 |
| JP | 6-8049 | A | 1/1994 |
| JP | 7-9258 | A | 1/1995 |
| JP | 10-43951 | A | 2/1998 |
| WO | WO-94/00265 | A1 | * | 1/1994 |

* cited by examiner

Primary Examiner—Geoffrey S. Evans
(74) Attorney, Agent, or Firm—Sughrue Mion, PLLC

(57) ABSTRACT

A wire cutting electric discharge machine has a high frequency voltage applying unit that applies a high frequency voltage and a direct current voltage applying unit applies a direct current voltage to the gap between the wire electrode and the workpiece. A detecting unit detects a low frequency component of a voltage occurring in the gap as a result of the electric discharge. The apparatus controls a feed rate based upon the state of the gap determined by the detecting unit.

11 Claims, 7 Drawing Sheets

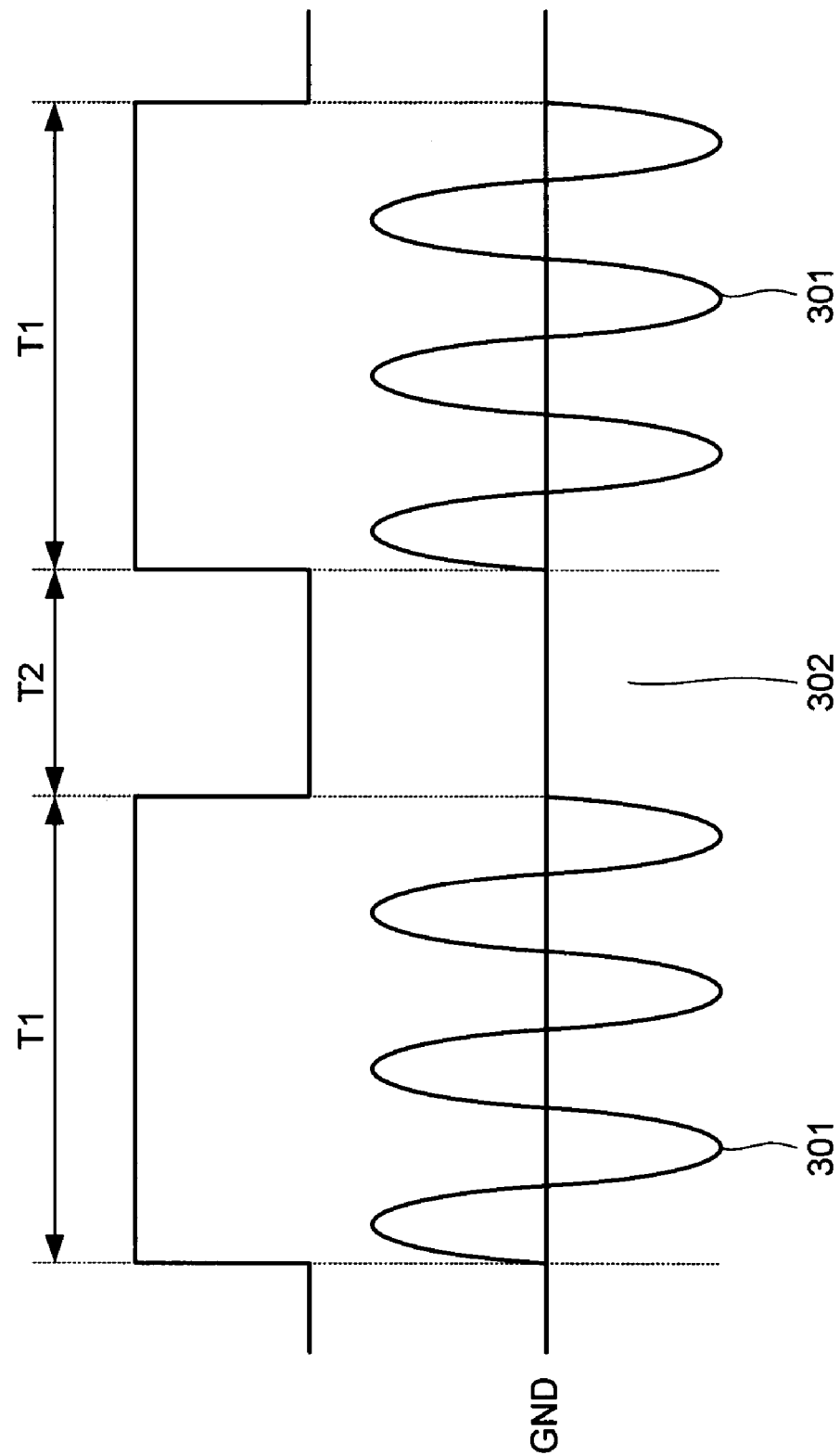

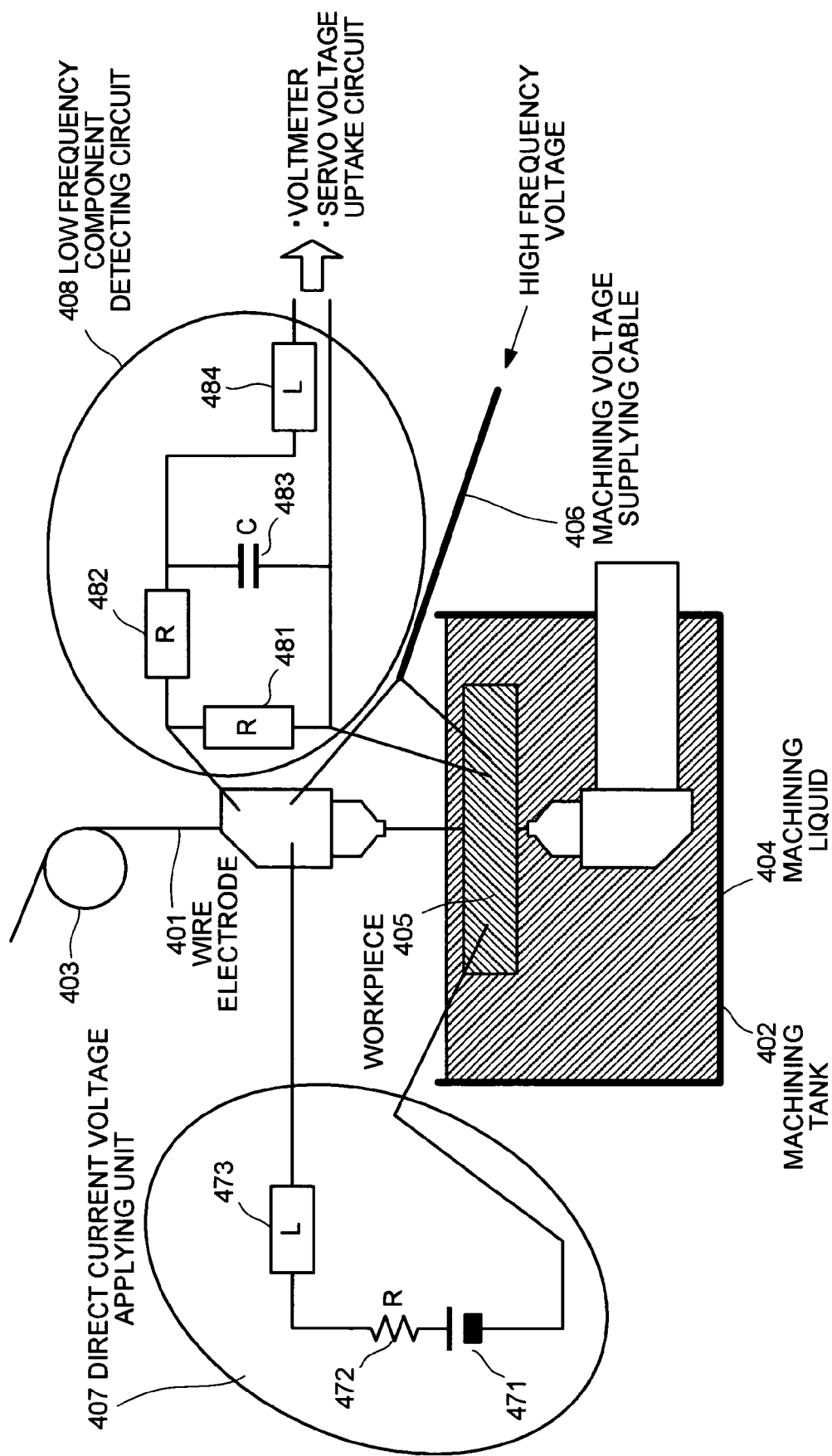

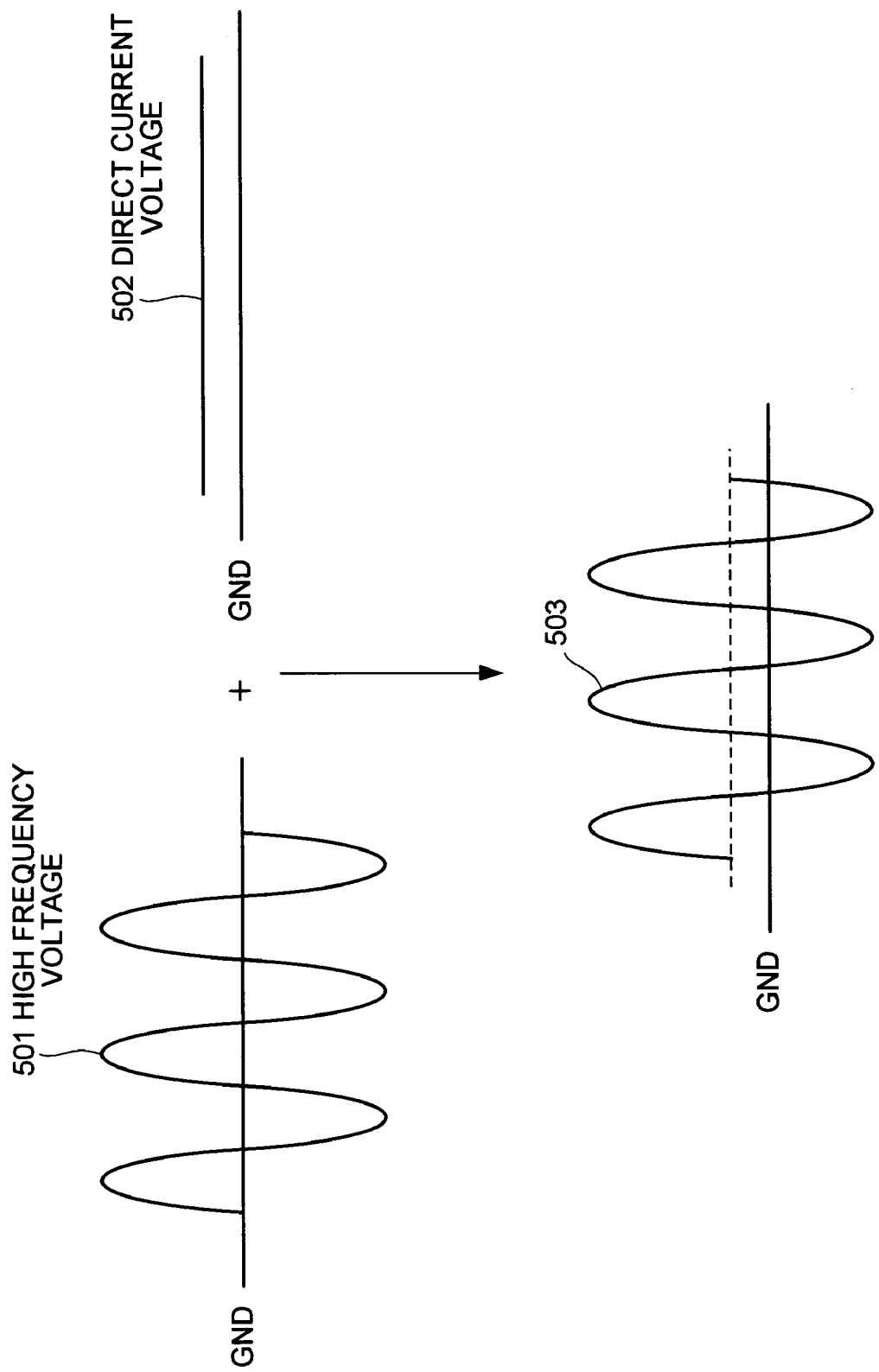

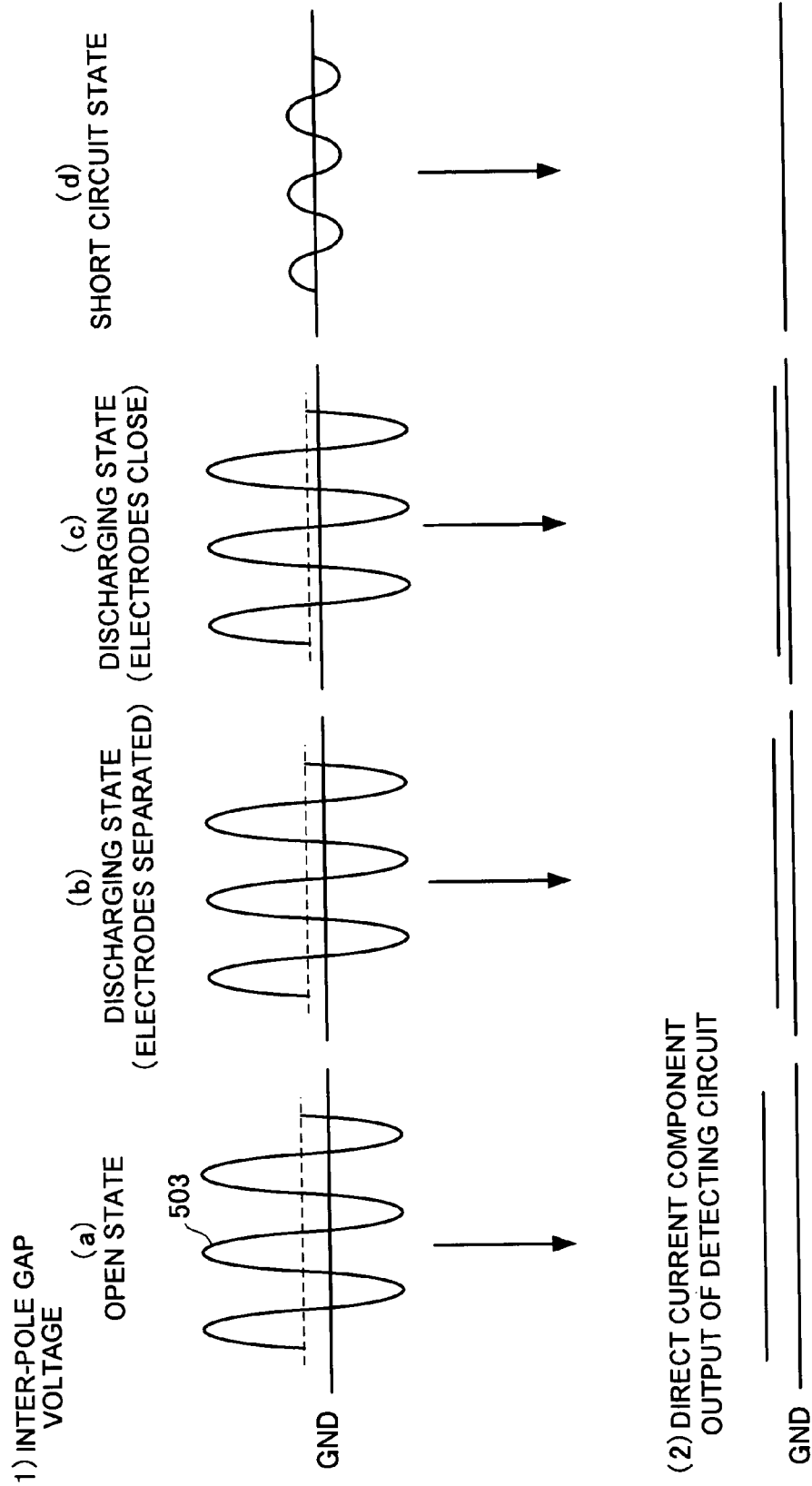

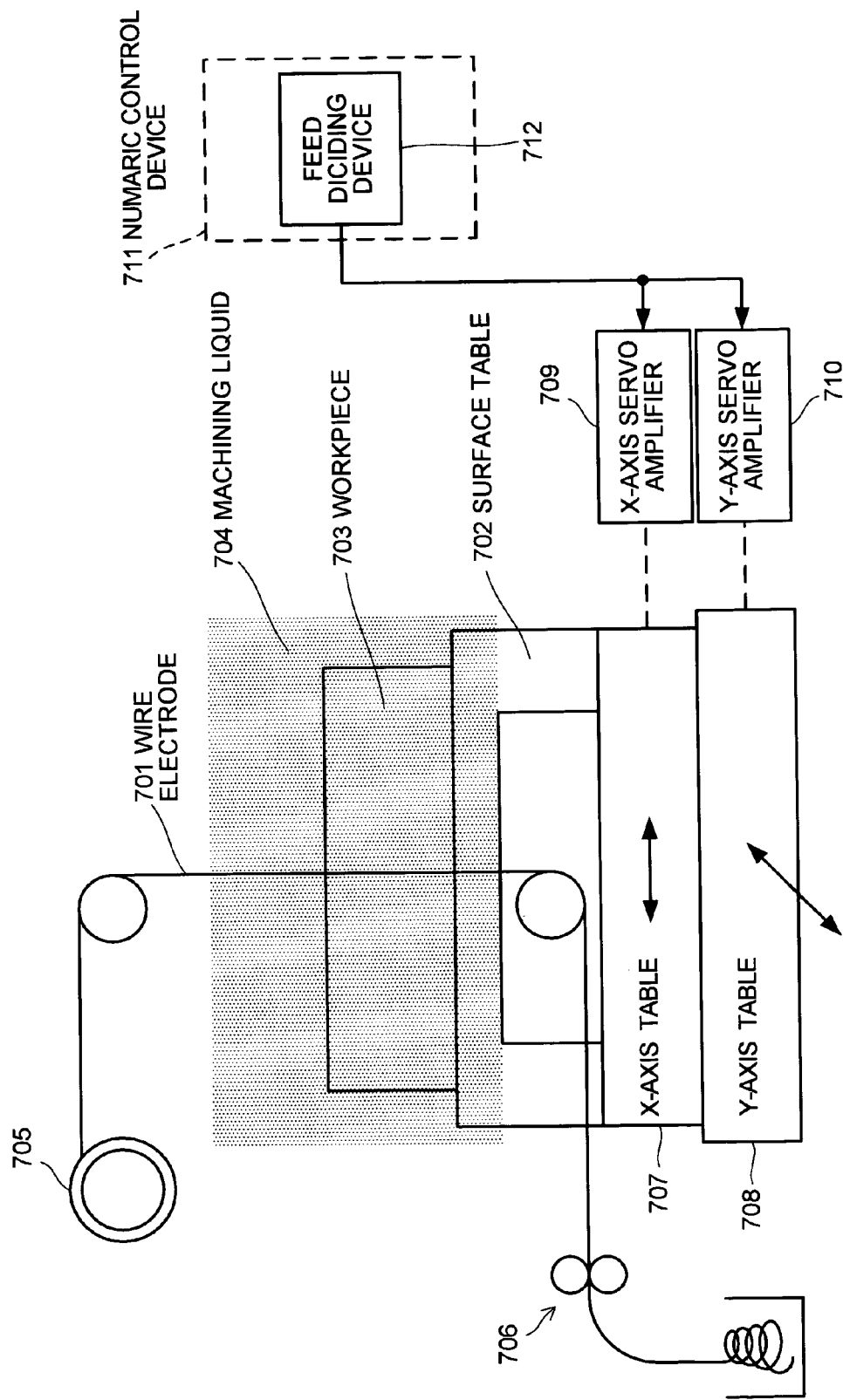

WIRE ELECTRICAL DISCHARGE MACHINING APPARATUS

TECHNICAL FIELD

The present invention relates to a wire electrical discharge machining apparatus. More particularly, this invention relates to a wire electrical discharge machining apparatus, in which a wire electrode and a workpiece are located in an opposed manner with a designated gap and an electrical discharge is generated intermittently between the wire electrode and the workpiece to thereby machine the workpiece based on the electrical discharge.

BACKGROUND ART

It is known that a finely machined surface can be obtained in a wire electrical discharge machining when an electrical discharge of short duration is generated repeatedly by applying a high-frequency voltage in a gap (hereinafter, "a machining gap" or "an inter-pole gap") between a wire electrode and a workpiece.

For example, Japanese Patent Application Laid-open No. S61-260915 (power source for electric discharge machining) discloses that a machined surface less than 1 μmRmax can be obtained if a frequency of the high-frequency voltage that is applied in the machining gap is between 1.0 megahertz and 5.0 megahertz.

Japanese Patent Application Laid-open No. H7-9258 (method and device for electric discharge machining, electrostatic capacitance device and inductance varying device both applicable thereto) disclose that a machined surface less than 5 μmRmax can be obtained if the frequency of the high-frequency voltage applied in the machining gap is between 7.0 megahertz and 30 megahertz.

FIG. 1 is a block diagram of a power supply source that is commonly used in a wire electrical discharge machining apparatus. This power supply source includes a direct current power source 101 and a high-frequency oscillator amplification-circuit 102. The direct current power source 101 supplies power to the high-frequency oscillator amplification-circuit 102. The high-frequency oscillator amplification-circuit 102 generates a high-frequency voltage based on the power received from the direct current power source 101. The high-frequency voltage is applied to a wire electrode 103 and a workpiece 104. The wire electrode 103 and the workpiece 104 are located, at a site where an electric discharge is to be generated, in an opposite manner with a designated gap, i.e., a machining gap 105.

The direct current power source 101 generates a constant direct current voltage or a direct current power in response to an external instruction. The high-frequency oscillator amplification-circuit 102 generates the high-frequency voltage based on the direct current voltage or the direct current power. The high-frequency oscillator amplification-circuit 102 applies a high-frequency voltage in the machining gap 105. As a result, a high-frequency electric discharge is generated in the machining gap 105 and the workpiece is machined by the energy of the electric discharge.

FIG. 2 is an example of a waveform of no-load voltage that is the high-frequency voltage applied in the machining gap. A high-frequency voltage 201 applied in the machining gap has a waveform in which the voltage oscillates symmetrically around a ground (GND) electrical potential, which is a reference level. It is known that if the high-frequency voltage 201 of a frequency more than 1 megahertz is applied repeatedly and continuously, a finely machined surface can be obtained.

FIG. 3 is an example of a waveform of voltage when the high-frequency voltage is applied with a stop interval in which the voltage is not applied. FIG. 3 illustrates an example of a case when a high-frequency voltage 301 is applied repeatedly with a stop interval 302 of duration T2. A power supply source that generates this type of high-frequency voltage has been put in use. It is known that this type of high-frequency voltage improves the smoothness and finishing line of the surface of the workpiece.

It is known in the art to control the machining based on a real voltage (hereinafter, "inter-pole gap voltage") in the machining gap in order to maintain a stable machining state. This control is carried out as follows. When the electrical discharge starts between the wire electrode and the workpiece, the inter-pole gap voltage decreases. The more the wire electrode approaches the workpiece and a discharge period becomes shorter, namely the more frequently the discharge occurs, the inter-pole gap voltage decreases further. Therefore, it is possible to estimate a width of the machining gap and determine whether the width is too short or too long.

Precisely, the inter-pole gap voltage is rectificated and transformed to a voltage that has one polarity. Based on this voltage, it is estimated whether a state in the inter-pole gap is an open state, a short circuit state, or a discharging state. The open state means that the electrical discharge does not take place. The short circuit state means that the wire electrode and the workpiece have short circuited. The discharging state means that the electrical discharge once occurred, but now the wire electrode and the workpiece have short circuited. A relative feed rate between the wire electrode and the workpiece is controlled (hereinafter, "an inter-pole gap servo") based on the state determined in such a manner that the workpiece is machined in a stable manner.

The high-frequency voltage that has a frequency of more than several megahertz is beyond an operating limit of a rectification circuit of the wire electrical discharge machining apparatus. As a result, it is difficult to monitor the state in the machining gap and, therefore, it is difficult to control the relative feed rate between the wire electrode and the workpiece.

In other words, when a high-frequency power supply source is used, it is sometimes difficult to maintain the stable machining state. It is possible to maintain the stable machining condition when relative movement between the wire electrode and the workpiece is performed at a constant speed. An example of such machining is a machining when the machining amount changes very little, such as when performing finishing machining of a roughly machined workpiece. However, when the machining amount changes considerably as a result of change in the shape of the workpiece during machining, as it is difficult to maintain a stable machining state because it is difficult to monitor the state in the machining gap, traces of lines get easily formed on the machining surface. The shape of the workpiece may change due to distortion of the workpiece during the machining. As a result, at the time of a first-cut or if there is a variation in the machining amount, the high-frequency power supply source gives bad results.

Thus, although the wire electrical discharge machining apparatus with the high-frequency power supply source gives better results in general, there are drawbacks that need to be taken care of to meet strict market demands. One approach to solve this problem is to control the relative feed rate based on a state in the inter-pole gap. For example, Japanese Patent Application Laid-open No. H10-43951 (wire electric discharge machining device) discloses a technology to detect whether the wire electrode and the workpiece have made a physical contact and then control the feed rate based on a result of the detection in a manner to achieve stable machining condition. However, in this publication does not disclose a method to detect whether the wire electrode and the workpiece have made a physical contact.

DISCLOSURE OF THE INVENTION

It is an object of the present invention to solve at least the problems in the conventional technology.

A wire electrical discharge machining apparatus according to the present invention machines a workpiece based on a high-frequency voltage applied in an inter-pole gap between a wire electrode and a workpiece. This wire electrical discharge machining apparatus includes a direct current voltage applying unit that applies a direct current voltage in the inter-pole gap; and a low frequency component detecting unit that detects a low frequency component from a voltage in the inter-pole gap.

The other objects, features and advantages of the present invention are specifically set forth in or will become apparent from the following detailed descriptions of the invention when read in conjunction with the accompanying drawings.

BRIEF DESCRIPTION OF THE DRAWINGS

FIG. 3 is an example of a waveform of voltage when the high-frequency voltage is applied repeatedly with a stop interval in between;

FIG. 4 is a concrete circuit diagram of the wire electrical discharge machining apparatus according to a first embodiment of the present invention;

FIG. 5 is a waveform diagram to explain an inter-pole gap voltage;

FIG. 6 is a illustration of a principle to detect a direct current voltage component from the voltage in the inter-pole gap; and FIG. 7 is a concrete block diagram of a wire electrical discharge machining apparatus according to a second embodiment of the present invention.

BEST MODE FOR CARRYING OUT THE INVENTION

Figure 1:
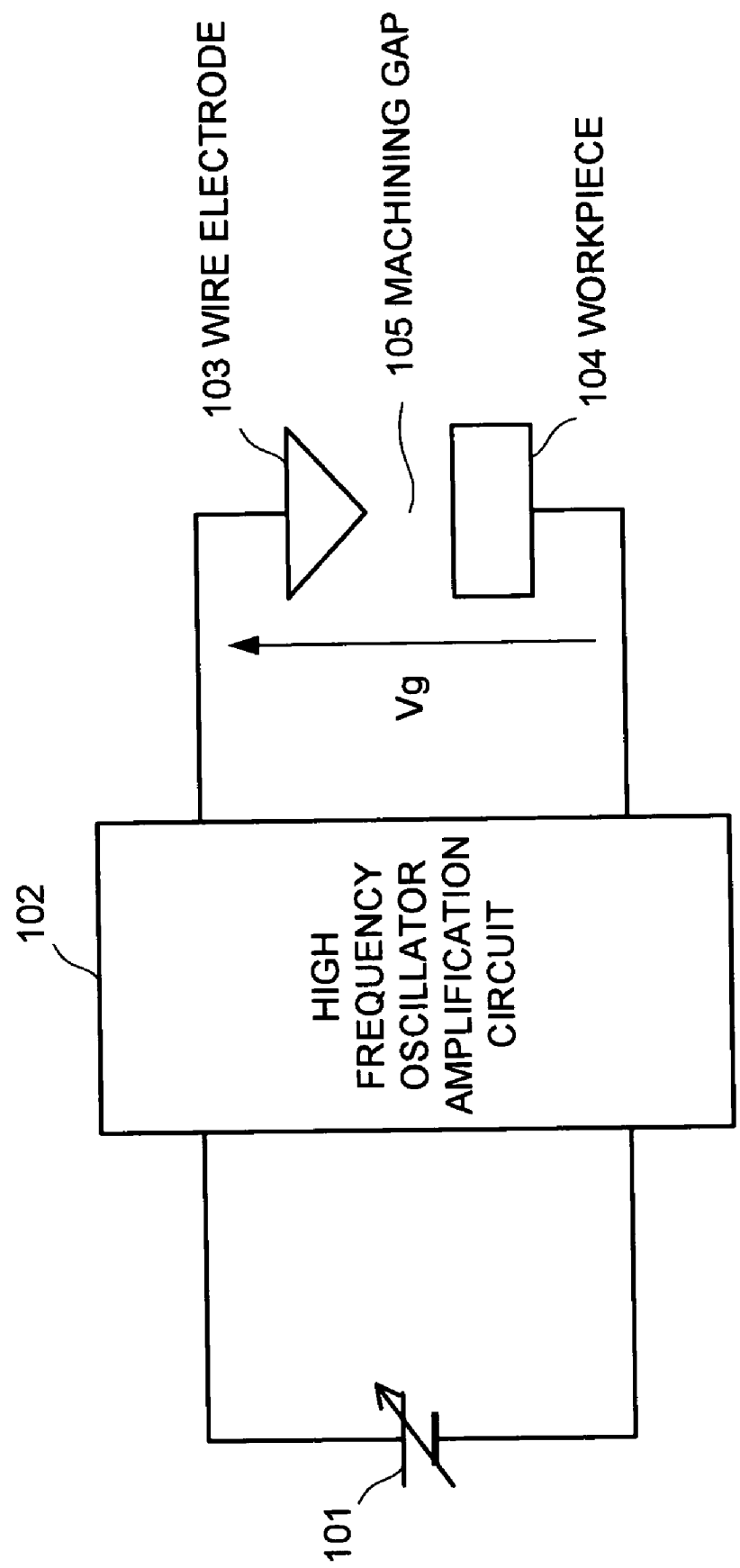
FIG. 1 is a general block diagram of a power supply source that is used in a wire electrical discharge machining apparatus.
Figure 2:
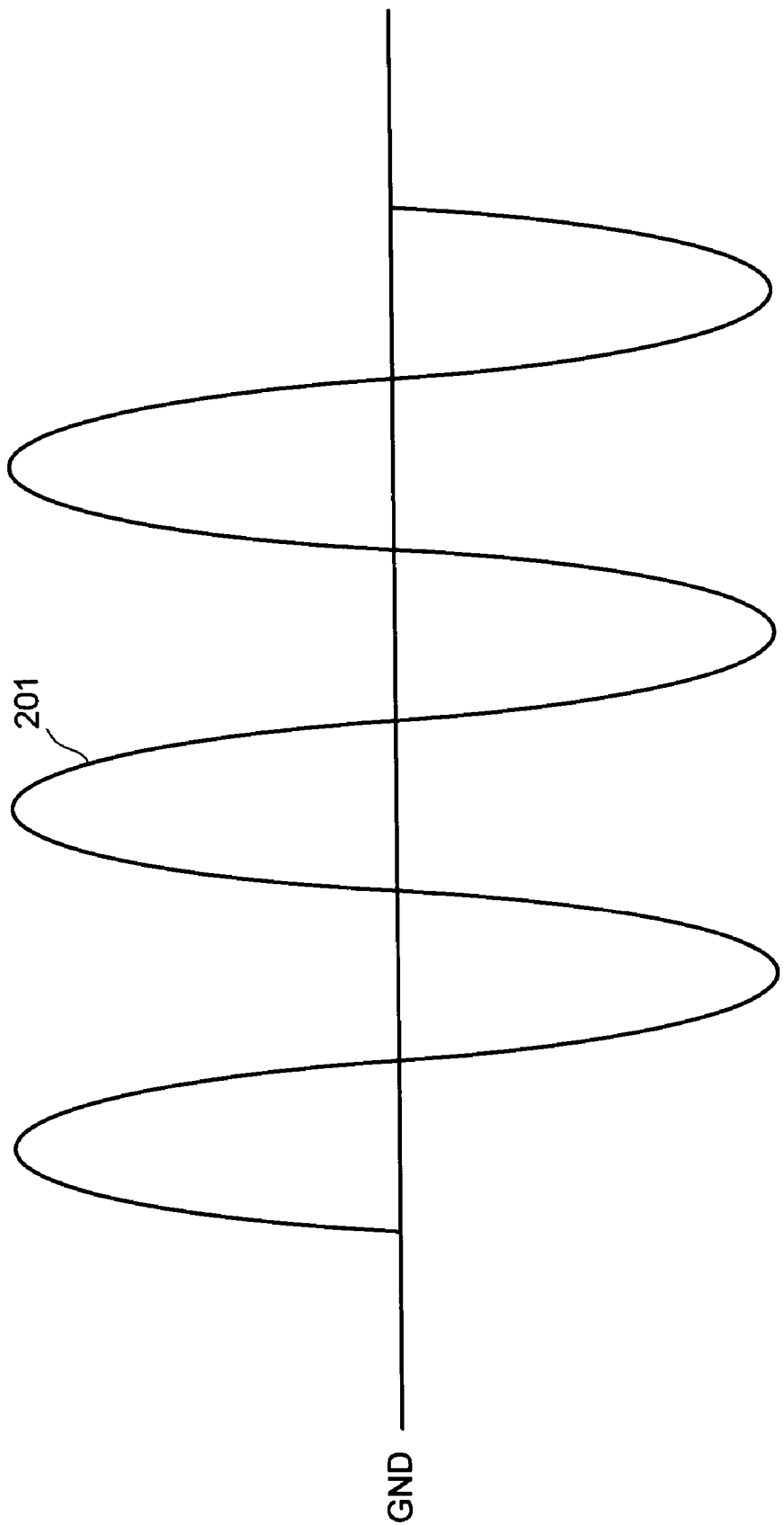
FIG. 2 is an example of a waveform of no-load voltage that is a high-frequency voltage applied in a machining gap.

Exemplary embodiments of a wire electrical discharge machining apparatus according to the present invention will be explained below while referring in the accompanying drawings.

FIG. 4 is a circuit diagram of a wire electrical discharge machining apparatus according to a first embodiment of the present invention. In this wire electrical discharge machining apparatus, a machining tank 402 is located in a course of a wire electrode 401. The wire electrode 401 is supplied in the machining tank 402 via a pool 403. The machining tank 402 is filled with a machining liquid 404. The wire electrode 401 and a workpiece 405 are connected respectively to a (not shown) high-frequency power supply source by way of a machining voltage supplying cable 406.

This wire electrical discharge machining apparatus includes a direct current voltage applying unit 407 and a low frequency component detecting circuit 408. The direct current voltage applying unit 407 applies a direct current voltage in the inter-pole gap, that is, a gap between the wire electrode 401 and the workpiece 405. The low frequency component detecting circuit 408 detects a low frequency component of a voltage occurring in the inter-pole gap because of an electrical discharge between the wire electrode 401 and the workpiece 405.

The direct current voltage applying unit 407 includes a direct current power source 471, a resistor (R) 472, and a reactance (L) 473. The direct current power source 471 outputs a low direct current voltage of about 10 volts. A negative terminal of the direct current power source 471 is connected to the workpiece 405 directly. A positive terminal of the direct current power source 471 is connected to the wire electrode 401 by way of the resistor (R) 472 and the reactance (L) 473.

The low frequency component detecting circuit 408 is a low pass filter that includes a resistor 481, a resistor 482, a capacitance 483, and a reactance (L) 484. A first terminal of the resistor 481 is connected to the wire electrode 401 and a second terminal is connected to the workpiece 405. A first terminal of the resistor 482 is connected to the first terminal of the resistor 481. A first terminal of the capacitance 483 is connected to a second terminal of the resistor 482 and a second terminal is connected to the second terminal of the resistor 481. A first terminal of the reactance (L) 484 is connected to the second terminal of the resistor 482.

Output terminals of the low frequency component detecting circuit 408 include a second terminal of the reactance 484 and the second terminal of the resistor 481. These output terminals are connected, for example, to a voltmeter and a servo voltage uptake circuit. The voltmeter measures and displays the direct current voltage of the low frequency component detected in the low frequency component detecting circuit 408. The servo voltage uptake circuit controls a relative feed rate of the wire electrode 401 and the workpiece 405 based on an inter-pole gap voltage.

An operation of the wire electrical discharge machining apparatus will be explained with reference to FIGS. 4, 5, and 6. FIG. 5 is a waveform diagram to explain the inter-pole gap voltage. FIG. 6 is an illustration of a principle to detect a direct current voltage component from the voltage in the inter-pole gap.

The high-frequency power supply source applies the high-frequency voltage to the wire electrode 401 and the workpiece 405 by way of the machining voltage supplying cable 406. Moreover, the direct current voltage applying unit 407 applies the direct current voltage, which is sufficiently lower than the high-frequency voltage, to the wire electrode 401 and the workpiece 405. As a result, a high-frequency voltage that is shifted by an amount equal to the direct current voltage is applied to the wire electrode 401 and the workpiece 405.

FIG. 5 illustrates a high-frequency voltage 501 supplied from the high-frequency power supply source and a direct current voltage 502 supplied from the direct current voltage applying unit 407. The high-frequency voltage 501 has a waveform in which the voltage oscillates symmetrically around a ground (hereinafter, "GND") electrical potential. Assuming that the direct current voltage 502 is positive, then the resultant voltage 503 applied to the wire electrode 401 and the workpiece 405 is a voltage that is shifted toward more positive direction by an equal amount equal to the direct current voltage 502.

An amount of the direct current voltage component, in other words, a shift amount of the high-frequency voltage that contributes to the electrical discharge, depends on impedance in the inter-pole gap. This impedance varies depending on whether the electrical discharge takes place or not. The impedance is high in a state that the electrical discharge has not taken place (hereinafter, "an open state"). Once the electrical discharge takes place, the impedance decreases, and finally, falls to nearly zero in a state that the electrodes have short circuited (hereinafter, "a short circuit state").

The low pass filter of the low frequency component detecting circuit 408 filters out a high-frequency component and passes only the low frequency component. Thus, it is possible to detect the direct current voltage component, which is the shift amount of the high-frequency voltage.

FIG. 6 is an illustration to explain a relation between a state in the inter-pole gap and an output of the low frequency component detecting circuit 408. In (1), examples of waveforms of the inter-pole gap voltage are shown such as (a) the open state, (b) a discharging state (electrodes separated), (c) a discharging state (electrodes close), and (d) a short circuit state.

In (a) the open state, the shift amount of the high-frequency voltage applied in the inter-pole gap maximum. The voltmeter monitors the output voltage of the low frequency component detecting circuit 408. As explained above, in a finishing machining, a machined surface gets easily spoiled, for example traces of lines are left on the surface, by even a slight disturbance of machining. Therefore, there is an increasing demand for monitoring the machining state and it is important to monitor the state in the inter-pole gap whether the state is the open state, the discharging state, or the short circuit state. According to the wire electrical discharge machining apparatus of the first embodiment, it is possible to monitor the state in the inter-pole gap.

As illustrated in (2) in FIG. 6, in (a) the open state, an output voltage of the low frequency component detecting circuit 408 is maximum. Once the electrical discharge takes place, the output voltage decreases as the discharging state varies from (b) the discharging state (electrodes separated) to (c) the discharging state (electrodes close). In (d) the short circuit state, the output voltage falls to nearly zero. Thus, in the open state, a relatively high voltage is output. In the short circuit state, the output voltage is nearly zero. In a process from (a) the open state to (d) the short circuit state, a voltage that is in between the maximum and zero is output.

The voltmeter monitors the output voltage of the low frequency component detecting circuit 408. As explained above, in a finishing machining, a machined surface gets easily spoiled, for example traces of lines are left on the surface, by even a slight disturbance of machining. Therefore, there is an increasing demand for monitoring the machining state and it is important to monitor the state in the inter-pole gap whether the state is the open state, the discharging state, or the short circuit state.

FIG. 7 is a block diagram of a wire electrical discharge machining apparatus according to a second embodiment of the present invention. This embodiment relates to performing an inter-pole gap servo control based on the output from the low frequency component detecting circuit that is described in the first embodiment.

This wire electrical discharge machining apparatus includes a surface table 702 that is located in the course of a wire electrode 701. A workpiece 703 is placed on the surface table 702. This workpiece is immersed in a machining liquid 704 in a (not shown) machining tank.

A first terminal of the wire electrode 701 is connected to a wire electrode bobbin 705. A second terminal of the wire electrode 701 is connected to a wire winding mechanism 706 thorough the surface table 702.

The surface table 702 includes an X-axis table 707 and a Y-axis table 708. The X-axis table 707 receives the X-axis driving signal from the X-axis servo amplifier 709. This X-axis table 707 moves the surface table 702 in the X-axis direction. The Y-axis table 708 receives the Y-axis driving signal from the Y-axis servo amplifier 710. This Y-axis table 708 moves the surface table 702 in the Y-axis direction.

A numeric control device 711 that controls the wire electrical discharge machining apparatus includes a feed deciding device 712. This feed deciding device 712 includes the servo voltage uptake circuit, which uptakes the output of the low frequency component detecting circuit 408. An output of the feed deciding device 712 is feed to the X-axis servo amplifier 709 and the Y-axis servo amplifier 710.

The feed deciding device 712 decides feed rates along the X-axis and the Y-axis from the output of the low frequency component detecting circuit 408. The feed deciding device 712 sends the X-axis driving signal and the Y-axis driving signal to the X-axis servo amplifier and to the Y-axis servo amplifier respectively, based on the feed rates decided.

In this wire electrical discharge machining apparatus that uses the high-frequency power supply source, the feed rate of the table on which the workpiece is placed is controlled based on the state in the inter-pole gap. As a result, a stable machining can be carried out even at the time of a first-cut or even if there is a variation in a machining amount.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

INDUSTRIAL APPLICABILITY

Particularly, this invention is suitable for a wire electrical discharge machining apparatus that machines a workpiece finely using a high-frequency power supply source.

The invention claimed is:

1. A wire electrical discharge machining apparatus that machines a workpiece based on a high-frequency voltage applied in an inter-pole gap between a wire electrode and the workpiece, comprising:

a high-frequency applying unit that applies a high-frequency voltage in the inter-pole gap;

a direct current voltage applying unit that applies a direct current voltage in the inter-pole gap; and a low frequency component detecting unit that detects a component of the direct current voltage in the inter-pole gap applied by the direct current voltage applying unit in the inter-pole gap between the wire electrode and the workpiece, wherein the component of the direct current voltage is varied depending on an impedance in the inter-pole gap, and wherein the impedance also varies in accordance with a discharging state in the inter-pole gap.

2. The wire electrical discharge machining apparatus according to claim 1, farther comprising:

a displaying unit that displays a state in the inter-pole gap based on an output of the low frequency component detecting unit.

3. The wire electrical discharge machining apparatus according to claim 1, farther comprising:
   a feed rate controlling unit that controls a feed rate based on an output of the low frequency component detecting unit.

4. The wire electrical discharge machining apparatus according to claim 1, farther comprising:
   a displaying unit that displays a state in the inter-pole gap based on an output of the low frequency component detecting unit; and
   a feed rate controlling unit that controls a feed rate based on an output of the low frequency component detecting unit.

5. A wire electrical discharge machining apparatus comprising:
   a workpiece;
   a wire electrode positioned near the workpiece with a gap of a specific width;
   a high-frequency voltage applying unit that applies a high-frequency voltage to the workpiece and the wire electrode to generate an electrical discharge between the workpiece and the wire electrode;
   a direct current voltage applying unit that applies separately a direct current voltage to the workpiece and the wire electrode while the high-frequency voltage applying unit applies the high-frequency voltage to the workpiece and the wire electrode; and
   a detecting unit that detects a low frequency component of a voltage generated in the gap between the workpiece and the wire electrode as a result of the electrical discharge.

6. The wire electrical discharge machining apparatus according to claim 5, further comprising:
   a state deciding unit that decides a state of the workpiece and the wire electrode based on the low frequency component detected by the detecting unit.

7. The wire electrical discharge machining apparatus according to claim 6, wherein the state comprises:
   an open state in which the width of the gap is such that no electric discharge occurs between the workpiece and the wire electrode;
   a discharging state in which the width of the gap is such that the electric discharge occurs between the workpiece and the wire electrode; and
   a short circuit state in which the workpiece and the wire electrode make an electric contact.

8. The wire electrical discharge machining apparatus according to claim 7, further comprising:
   an arrangement that relatively moves the workpiece and the wire electrode; and
   a controlling unit that controls the arrangement so as to relatively move the workpiece and the wire electrode based on the state that is detected by the detecting unit.

9. The wire electrical discharge machining apparatus according to claim 8, wherein the arrangement includes a table, the workpiece being placed on the table, the table includes a first table that moves in a first direction and a second table that moves in a second direction.

10. The wire electrical discharge machining apparatus according to claim 7, wherein the voltage detected by the detecting unit is voltage generated by the direct current voltage applying unit.

11. The wire electrical discharge machining apparatus according to claim 10, further comprising:
    a displaying unit displaying a state in the inter-pole gap based on an output of the low frequency component detecting unit,
    wherein, when the detecting unit detects the output of the low frequency component in a maximum voltage state, the open state is output from the detecting unit to the display unit, and
    wherein, when the detecting unit detects the low frequency component in a zero voltage state, the short circuit state is output from the detecting unit to the display unit.

* * * * *